United States Patent
Lee

(10) Patent No.: US 11,032,700 B2
(45) Date of Patent: Jun. 8, 2021

(54) SYSTEM AND METHOD FOR CONNECTED VEHICLE CONTROL

(71) Applicants: HYUNDAI MOTOR COMPANY, Seoul (KR); KIA MOTORS CORPORATION, Seoul (KR)

(72) Inventor: Jeongtae Lee, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/700,736

(22) Filed: Dec. 2, 2019

(65) Prior Publication Data

US 2021/0127260 A1    Apr. 29, 2021

(30) Foreign Application Priority Data

Oct. 29, 2019    (CN) .......................... 201911039978.8

(51) Int. Cl.

| | |
|---|---|
| *H04W 12/037* | (2021.01) |
| *H04W 4/48* | (2018.01) |
| *H04L 9/32* | (2006.01) |
| *B60R 25/20* | (2013.01) |
| *H04W 12/06* | (2021.01) |

(52) U.S. Cl.
CPC ......... *H04W 12/037* (2021.01); *B60R 25/209* (2013.01); *H04L 9/3226* (2013.01); *H04W 4/48* (2018.02); *H04W 12/06* (2013.01); *B60R 2325/101* (2013.01); *B60R 2325/108* (2013.01)

(58) Field of Classification Search
CPC ... H04W 12/0017; H04W 12/06; H04W 4/48; H04W 4/80; H04W 52/04; H04W 4/023; H04W 4/00547; B60R 25/209; B60R 2325/101; B60R 2325/108; B60R 25/245; B60R 2325/205; H04L 9/3226; H04M 1/7253; H04B 17/318; H04B 17/12; G07C 9/00309; G07C 2009/00547; G07C 2209/63

See application file for complete search history.

(56) References Cited

U.S. PATENT DOCUMENTS

| | | | |
|---|---|---|---|
| 7,224,980 B2 * | 5/2007 | Hara | ....................... B60R 25/24 340/10.1 |
| 8,319,605 B2 * | 11/2012 | Hassan | ................. G01S 13/825 340/5.72 |

(Continued)

FOREIGN PATENT DOCUMENTS

| | | |
|---|---|---|
| JP | 2017-533411 A | 11/2017 |
| KR | 10-2005-0009021 A | 1/2005 |
| KR | 10-1442169 B1 | 9/2014 |

*Primary Examiner* — Brian E Miller
(74) *Attorney, Agent, or Firm* — Brinks Gilson & Lione

(57) ABSTRACT

A system and method for connected vehicle control are provided. The system may include a communicator configured to connect, though a wireless communication, with a user application of a user terminal within a predetermined sensing distance, and perform a first authentication and a second authentication, a vehicle speaker, a body controller configured to control the vehicle based on a remote control signal transmitted by the user application, a start button formed inside the vehicle and configured to generate a start-on signal by pushing the start button, and a controller configured to control a start of the vehicle.

15 Claims, 11 Drawing Sheets

(56) References Cited

U.S. PATENT DOCUMENTS

| | | | |
|---|---|---|---|
| 9,855,918 B1* | 1/2018 | Melaragni | B60R 25/01 |
| 10,547,736 B2* | 1/2020 | Hannon | G01S 5/30 |
| 10,623,403 B1* | 4/2020 | Gupta | H04L 63/102 |
| 10,790,581 B2* | 9/2020 | Spick | H01Q 1/3241 |
| 2008/0157919 A1* | 7/2008 | Sugiura | B60R 25/24 |
| | | | 340/5.61 |
| 2008/0272981 A1* | 11/2008 | Gagne | H01Q 1/38 |
| | | | 343/895 |
| 2011/0148573 A1* | 6/2011 | Ghabra | B60R 25/245 |
| | | | 340/5.61 |
| 2014/0088975 A1* | 3/2014 | Davis | G08C 23/02 |
| | | | 704/500 |
| 2014/0333425 A1* | 11/2014 | Giraud | H04W 84/005 |
| | | | 340/438 |
| 2015/0356797 A1* | 12/2015 | McBride | G07C 9/29 |
| | | | 340/5.61 |
| 2017/0151928 A1* | 6/2017 | Kang | B60R 25/2045 |
| 2017/0151929 A1* | 6/2017 | Lee | H04W 4/40 |
| 2017/0200334 A1* | 7/2017 | Buttolo | G07C 9/21 |
| 2017/0238174 A1* | 8/2017 | Cech | H04W 12/0609 |
| | | | 455/411 |
| 2017/0243422 A1 | 8/2017 | Menard et al. | |
| 2018/0022314 A1* | 1/2018 | Ji | B60R 25/24 |
| | | | 340/5.61 |
| 2018/0290627 A1* | 10/2018 | Hariri | B60R 25/245 |
| 2019/0025402 A1* | 1/2019 | Qu | G01S 5/26 |
| 2019/0054898 A1* | 2/2019 | Okada | B60R 25/31 |
| 2019/0061685 A1* | 2/2019 | Lee | B60R 25/209 |
| 2019/0215604 A1* | 7/2019 | You | G10K 11/178 |
| 2019/0215606 A1* | 7/2019 | You | B60N 2/879 |
| 2019/0386984 A1* | 12/2019 | Thakkar | H04L 63/18 |

* cited by examiner

PRIOR ART

PRIOR ART at 2m apart from vehicle, window opened

SYSTEM AND METHOD FOR CONNECTED VEHICLE CONTROL

CROSS-REFERENCE TO RELATED APPLICATION

This application claims priority to and the benefit of Chinese Patent Application No. 201911039978.8 filed on Oct. 29, 2019, the entire contents of which are incorporated herein by reference.

TECHNICAL FIELD

The present disclosure relates to a system and method for smart key-free vehicle control.

BACKGROUND

The statements in this section merely provide background information related to the present disclosure and may not constitute prior art.

In the past, most of vehicles were to be opened/closed or started only with inserting a key into the door or key box. But recently, vehicles applying a system using a smartkey, so that door opening/closing or engine starting, is available even without inserting the key or pressing a button but only with having the key are gradually increased.

Meanwhile, as a research for the connected vehicle is recently increased, smartkey-free systems are being developed or launched in which the user opens/closes the door or starts the vehicle using a smartphone possessed by the user without using the smartkey.

Representative methods include technologies using Near Field communication (NFC) and Bluetooth Low Energy (BLE) communication of smartphones.

Here, since the NFC is a method in which the user is directly in contact with the smartphone, it is excellent in security, but has a disadvantage in that a communication distance is short and has problems that it is inconvenient to use the NFC because the user should be in contact with the smartphone (NFC) every time to open or close the door or starting the vehicle. The cost of related parts for recognition is also increased.

On the other hand, since these problems can be solved by applying BLE communication technology, smartkey-free system using the BLE communication has been recently spotlighted.

However, since the BLE operates at a communication distance within about 100 m based on BT ver4.2, there are problems that it is vulnerable to security and the doors may be opened or vehicle may be started by others when a signal is hacked within the above-mentioned distance.

Therefore, in developing the smartkey-free using BLE communication, improving security may be of an important issue.

SUMMARY

The present disclosure provides a system and method for connected vehicle control.

A system for connected vehicle control in one form of the present disclosure may include a communicating unit i.e., communicator configured to connect, though wireless communication, with a user application of a user terminal within a predetermined sensing distance, and performing first and second authentications, the user application being capable of registering a vehicle information and having a remote control function to control the vehicle of the registered vehicle information, a vehicle speaker, a body control module controlling the vehicle according to a remote control signal transmitted according to the remote control function of the user application, a start button formed inside the vehicle and generating a start on signal by a button input, and a controller controlling a starting of the vehicle. The vehicle information includes at least a Vehicle Identification Number(VIN), a first authentication key and a second authentication key. The remote control signal is received from the user terminal of which the remote control function is activated by the first authentication. The remote control function includes at least door lock/unlock function, and does not include vehicle starting function. The communicating unit is configured to generate an encrypted sound signal to perform the second authentication, and output the encrypted sound signal through the vehicle speaker. When the start on signal is input, the controller starts the vehicle only in case the second authentication is successful.

The communicating unit may be implemented by Bluetooth low energy (BLE).

The communicating unit may include an RF antenna radiating an RF signal to the outside of the vehicle and performing a remote wireless communication connection with the user terminal, and a communication control module storing authentication information such as a first authentication code, a second authentication code, the first authentication key, and the second authentication key which are independent from each other for performing the first and second authentication when it is connected with the user application.

The communication control module may be configured to, when the user terminal within the predetermined sensing distance is detected, connect with the user application through wireless communication, and perform the first authentication by transferring the first authentication code to the user application.

The communication control module may be configured to, when the first authentication is successful, generate an encrypted signal by encrypting the second authentication code, and generate the encrypted sound signal by converting the encrypted signal, and to receive, through the wireless communication, a response signal generated by the user application by converting the encrypted sound signal with the second authentication key after receiving the encrypted sound signal through a microphone of the user terminal.

The communication control module may be configured to generate a verification signal by converting the encrypted sound signal with the second authentication key, and determine whether the response signal is valid by comparing the response signal received from the user application with the verification signal, and the second authentication may be determined to be successful when the response signal is determined to be valid and when the sound wave level of the encrypted sound signal received through the microphone is equal to or greater than a first predetermined sound level.

The communication control module may be configured to set an output level of the encrypted sound signal output by the vehicle speaker to be a second predetermined sound level when vehicle doors and vehicle windows are all closed, the third predetermined sound level may be set to a value less than the second predetermined sound level.

The encrypted sound signal may be generated in the form of a high frequency sound signal and has a frequency of at least 18 kHz.

The controller may be configured to transmit the start on signal to any one driving source of an engine, a driving motor, and a fuel cell stack according to the kind of the vehicle and initiates the starting of the vehicle.

The communicating unit may be implemented by any one communication device of Wifi, wireless LAN, radio frequency (RF), and Zigbee that perform local communication connection with the user terminal.

A method for connected vehicle control of a system for connected vehicle control in another form of the present disclosure may include performing, by the communicating unit, a first authentication of the user application thereby activating a remote control function in the user application when the first authentication is successful, performing, by the communicating unit, a second authentication when the start on signal is input, and initiating, by the controller, the starting of the vehicle when the second authentication is successful. The vehicle information may include at least a Vehicle Identification Number(VIN), the first authentication key and the second authentication key. he remote control function may include at least door lock/unlock function, and may not include vehicle starting function, and wherein The performing of the second authentication may include generating, by the communicating unit, an encrypted sound signal, and outputting the encrypted sound signal though the vehicle speaker.

The performing the first authentication may include connecting, by the communicating unit, with the user application of the user terminal within the predetermined sensing distance, transmitting, by the communicating unit, a first authentication code to the user application, and determining, by the user application, whether the first authentication key is valid based on the first authentication code The generating, by the communicating unit, an encrypted sound signal may include generating an encrypted signal by encrypting the second authentication code, and generating the encrypted sound signal by converting the encrypted signal.

The performing the second authentication further may include receiving, by the user application, the encrypted sound signal through a microphone of the user terminal, generating, by the user application, a response signal by converting the encrypted sound signal with the second authentication key, and transferring the response signal to the communicating unit through wireless communication, generating, by the communicating unit, verification signal by converting the encrypted sound signal with the second authentication key, and determining whether the second authentication is successful.

The determining whether the second authentication is successful may include determining, by the communicating unit, whether the response signal is valid by comparing the response signal received from the user application with the verification signal, and determining, by the user application, whether the sound wave level of the encrypted sound signal received through the microphone is equal to or greater than a first predetermined sound level, and wherein the second authentication may be determined to be successful when the response signal is determined to be valid and when the sound wave level of the encrypted sound signal received through the microphone is equal to or greater than the first predetermined sound level.

The generating the encrypted sound signal by converting the encrypted signal may include determining whether vehicle doors and vehicle windows are all closed, setting the output level of the encrypted sound signal output by the vehicle speaker to be a second predetermined sound level when the vehicle doors and the vehicle windows are all closed, and setting the output level of the encrypted sound signal output by the vehicle speaker to be a third predetermined sound level when the vehicle doors and the vehicle windows are not all closed, wherein the third predetermined sound level may be set to a value less than the second predetermined sound level.

The encrypted sound signal may be generated in the form of a high frequency sound signal and has a frequency of at least 18 kHz.

In some forms of the present disclosure, in a connected service vehicle to which a smart key free system using BLE communication is applied, by providing a separate starting condition according to the situation of the vehicle without relying only on the security solution of the BLE communication itself, It can inhibit the possibility of car takeover by hacking and improve the security of the system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
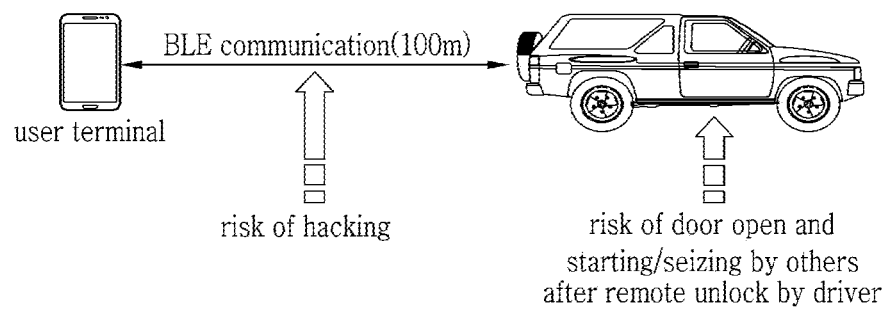
FIG. 1 is an illustrative view illustrating a connected vehicle control system using a conventional BLE and a problem thereof.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Vehicles, automobiles or other similar terms used throughout the specification includes sports utility vehicles (SUVs), buses, trucks, cars including various commercial vehicles, ships including various kinds of boats and vessels, aircraft, and vehicles similar thereto, and includes hybrid vehicles, electric vehicles, plug-in hybrid electric vehicles, hydrogen fuel vehicles, and other alternative fuel (e.g., fuel obtained from sources other than oil) vehicles.

Hereinafter, a system and method for a vehicle control in some forms of the present disclosure will be described in detail with reference to the accompanying drawings.

FIG. 1 is an illustrative view illustrating a smartkey-free vehicle control system using a conventional BLE and a problem thereof.

Referring to FIG. 1, a conventional smartkey-free vehicle control system is connected to a smartphone of a user through BLE communication to open/close a vehicle door and to control a start thereof.

However, since the BLE operates at a communication distance within about 100 m based on BT ver4.2, it may be vulnerable to security and the doors may be opened or vehicle may be started by others when a signal is hacked within the above-mentioned distance.

Figure 2:
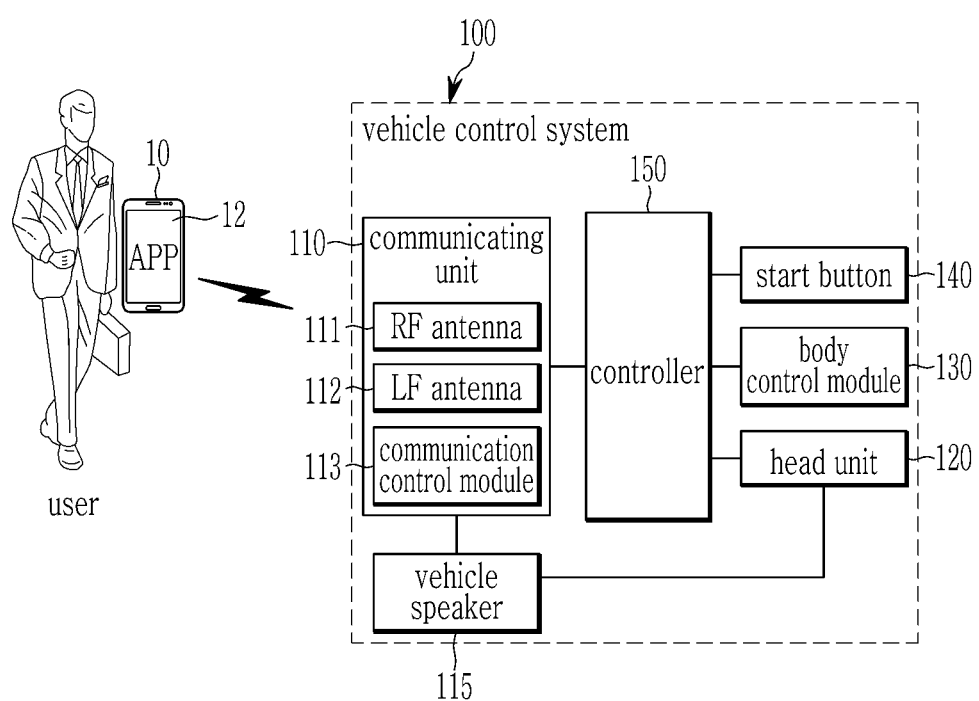
FIG. 2 is a block diagram schematically illustrating a configuration of a system for connected vehicle control in one form of the present disclosure.

FIG. 2 is a block diagram schematically illustrating a configuration of a system for connected vehicle control in some forms of the present disclosure.

Referring to FIG. 2, a system 100 for a connected vehicle control in some forms of the present disclosure includes a communicating unit 110, a vehicle speaker 115, a head unit 120, a body control module (BCM) 130, a start button 140, and a controller 150.

The communicating unit 110 connects wireless communication with a user application 12 installed in a user terminal 10 and performs communication for supporting a smartkey-free control function of a vehicle.

The user terminal 10, which is an information communication terminal possessed by a user, is not limited to following examples, but may be a smartphone, a wearable terminal, a notebook, a tablet PC, or the like which is capable of communicating with the communicating unit 110.

For example, the communicating unit 110 includes Bluetooth Low Energy (BLE) and the BLE may communicate with the user terminal 10 within about 100 m based on BT ver4.2. The BLE is not limited to BT ver4.2 version, but other up/down versions may be applied and a communication distance may be changed accordingly.

The communicating unit 110 may be mounted in an audio, video, navigation (AVN) or a telematics unit, and includes a radio frequency (RF) antenna 111, and a communication control module 113.

The RF antenna 111 radiates an RF signal around the vehicle within about 100 m based on BT ver4.2 and connects remote wireless communication with the user terminal 10 existing outside or inside the vehicle.

The communication control module 113 controls an overall operation for connecting the user application 12 with BLE communication through the RF antenna 111.

The control module 113 stores authentication information of a first authentication key and a second authentication code which are independent from each other for each connecting wireless communication with the user application 12.

The vehicle speaker 115 is a typical vehicle interior speaker provided in a vehicle, and may be connected to the head unit 120 to output a sound signal output from the head unit 120.

In addition, the vehicle speaker 115 may be connected to the communication control module 113 to output a sound signal for communication with the user terminal 10 under the control of the communication control module 113.

The body control module 130 controls the vehicle according to the remote control signal transmitted by the remote control function of the user application 12.

More particularly, the body control module 130 performs the vehicle control such as the door unlock and the door lock according to the remote control signal received through the communicating unit 110. Further, the body control module 130 may further control an open of a tail gate, an open of a door window, and an emergency light and an alarm sound output for displaying a parking position of the vehicle according to instructions of the remote control signal. The instructions may be input from the user application 12.

The start button 140 generates a start on signal by a button input and generates a start off signal by a button input in a state in which the vehicle is started.

The controller 150 controls an overall operation for a starting control in some forms of the present disclosure and includes hardware, programs, and data for the control. To this end, the controller 150 may be implemented as at least one processor that is operated by a predetermined program, and the predetermined program may be programmed in order to perform each step of a method for connected vehicle control in some forms of the present disclosure.

The controller 150 may include a smartkey controller (SMK) to which a smartkey-free starting control function is added, but is not limited thereto, and may also include an electronic control unit (ECU) of a super ordinate concept controlling a variety of controllers provided to operate the vehicle, including the smartkey controller.

The controller 150 may determine whether the second authentication condition is satisfied, initiate the vehicle starting when the second authentication condition is satisfied, and restrict the vehicle starting when the second authentication condition is not satisfied.

When the second authentication succeeds in the state in which the starting on signal is input to the controller 150, the controller transmits the start on signal to a driving source (not shown) of the vehicle and initiates the starting of the vehicle. Here, the driving source may be any one of an engine, a driving motor, and a fuel cell stack according to a kind of the vehicle and an operation thereof may be initiated according to the starting of the vehicle.

In addition, it is apparent that the controller 150 may further check whether usual starting conditions of an existing smartkey controller are satisfied, when the signal of the start button 140 is input. The usual starting conditions may include conditions such as a P/N stage state of a transmission and/or a brake on state.

Meanwhile, a method for a vehicle control for a connected vehicle control in some forms of the present disclosure will be described with reference to FIGS. 3 to 5 based on the configuration of the system 100 for a connected vehicle control described above.

FIG. 4 is a conceptual view schematically illustrating a system for a connected vehicle control in some forms of the present disclosure, and FIG. 5 is a group of graphs schematically illustrating a system for a connected vehicle control in some forms of the present disclosure.

Figure 3A:
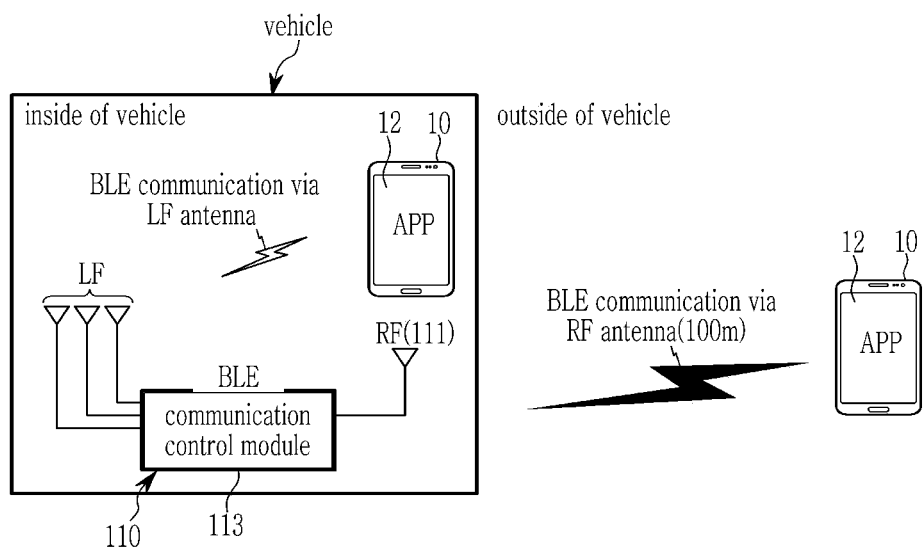
FIGS. 3A and 3B are conceptual views illustrating a method for connecting a user terminal with a communicating unit in one form of the present disclosure.

FIG. 3A is a conceptual view illustrating a method for connecting a user terminal with a communicating unit according to an conventional art.

Referring to FIG. 3A, the communicating unit 110 in some forms of the present disclosure may include four multi-input systems based on BT ver.4.2 and may include one RF antenna 111 for remote communication outside the vehicle and three LF antennas 112 for local communication inside the vehicle.

The RF antenna 111 is a basic antenna of BLE, through which communication control module 113 of the communicating unit 110 connects wireless communication with a user application 12 of a user terminal 10 within 100 m, which is a maximum sensing distance.

The LF antenna 112 connects local wireless communication connection with the user application of the user terminal 10 existing inside the vehicle. Here, the LF antenna 112 forms a communication region for Bluetooth communication inside the vehicle and serves as an indoor antenna for searching for whether the user terminal 10 exists inside the vehicle.

The communication control module 113 connects wireless communication with a user application 12 of a user terminal 10 within sensing distance of the RF antenna 111 and transmits a first authentication code to the user application 12. The user application 12 determines whether a predetermined first authentication key is valid based on the first authentication code. When the start authentication key is determined to be valid, the first authentication succeeds, and a remote control function of the user application 12 is activated.

Here, the remote control function of the user application 12 includes at least door lock/unlock function so that the user can remotely lock or unlock the vehicle door. In detail, the communication control module 113 may transmit the door lock/undock signal transmitted from the user application 12 through the RF antenna 111 to a body control module 130, and the body control module 130 may remotely lock or unlock the vehicle door according to the door lock/undock signal Further, when a starting on signal is input from a start button 140, the communication control module 113 connects local wireless communication with the user application 12 and performs a second authentication. Thereby, when the user terminal 10 exists inside the vehicle, the connection through the RF antenna 111 is switched to the connection through the LF antenna 112.

Here, the communicating unit 110 communicates with the user application 12 through three LF antennas 112. Therefore, the communicating unit 110 may determine the location of the user terminal 10 to be inside or outside the vehicle by using a trigonometric method or the like.

Further, when the LF antenna 112 and the user application 12 are communicated with each other, the communication control module 113 may perform authentication with independent second authentication key which is different from the case of the connection of the RF antenna 111.

Here, the case in which the location of the user terminal 10 is determined to be inside the vehicle, and the case in which the second authentication key is determined to be valid based on the first and second authentication code which are different from each other are defined as states in which a second authentication condition in some forms of the present disclosure is satisfied.

That is, the controller 150 may initiate the starting of the vehicle only when the secondary authentication is successful. If any one of the defined second authentication conditions is not satisfied, the vehicle may not be started, and since a motor-driven power steering (MDPS) also locks and not moves, the vehicle may not be driven.

Therefore, the system 100 for a vehicle control according to a conventional art may improve security of a vehicle control because a vehicle starting function is limited in a case in which all the second authentication conditions are not satisfied, even though a corresponding signal is sniffed by a hacking of an intruder in a state in which the communicating unit 110 is connected to the user terminal through RF antenna 111.

Figure 3B:
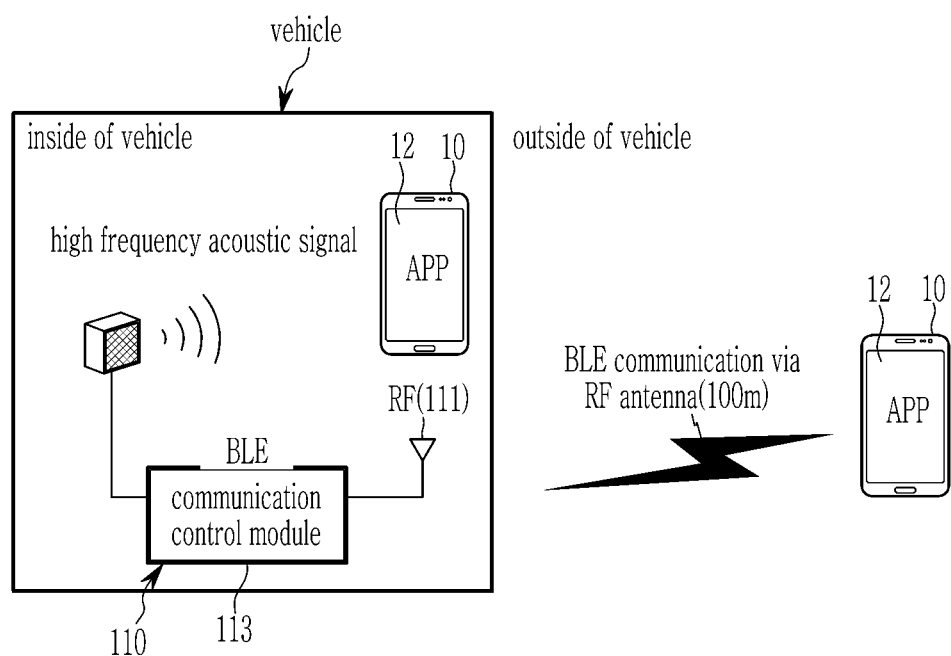

FIG. 3B is a conceptual view illustrating a method for connecting a user terminal with a communicating unit in some forms of the present disclosure.

In the description of the method for connecting a user terminal with a communicating unit in some forms of the present disclosure based on FIG. 3B, a description overlapping with the method for connecting the user terminal with the communicating unit according to an conventional art described above based on FIG. 3A will be omitted.

Referring to FIG. 3B, the communicating unit 110 in some forms of the present disclosure does not include LF antennas, unlike the communicating unit according to the related art. That is, the communicating unit 110 in some forms of the present disclosure does not perform the second authentication by the RF antenna and the LF antenna, unlike the communicating unit 110 according to the prior art.

Instead, the communicating unit 110 outputs an encrypted sound signal in the form of a high frequency sound signal through a vehicle speaker for the second authentication, and the user terminal 10 receives the encrypted sound signal through a microphone.

As such, a communicating unit in some forms of the present disclosure may improve security of a vehicle starting control by performing second authentication like a conventional art, and also, may reduce the cost for design and production by deleting the LF antenna of the conventional art and performing the second authentication through a vehicle speaker that is typically provided in the vehicle.

Figure 4A:
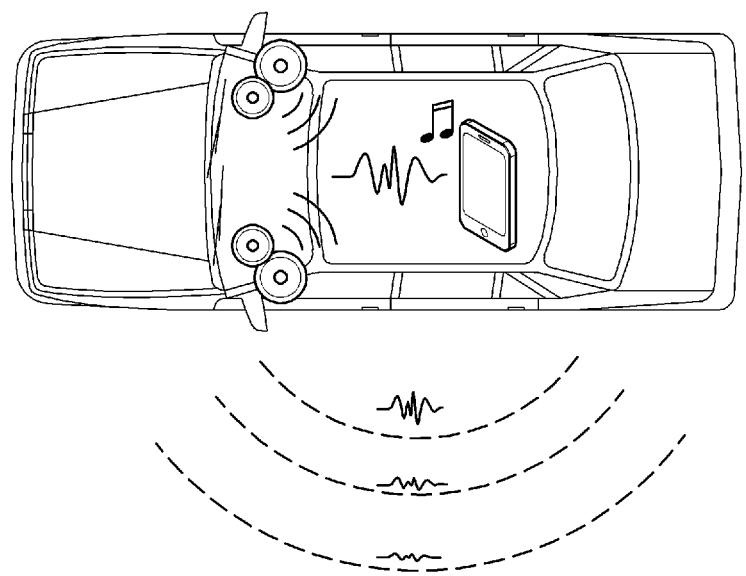
FIGS. 4A and 4B are conceptual views schematically illustrating a system for a connected vehicle control in one form of the present disclosure.
Figure 4B:
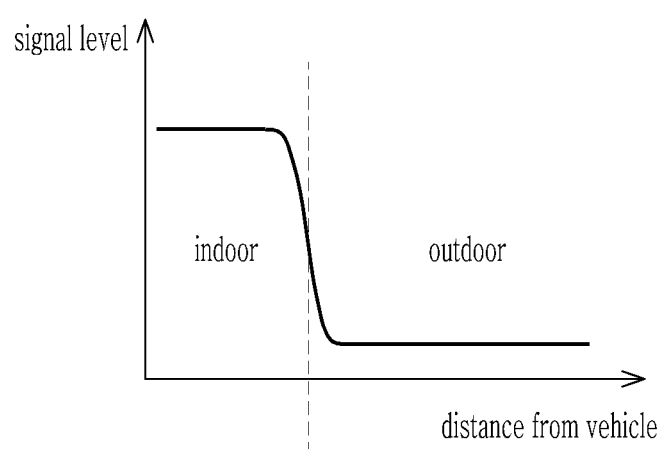

FIG. 4A is a conceptual view schematically illustrating a system for a connected vehicle control in some forms of the present disclosure, and FIG. 4B is a graph schematically illustrating a system for a connected vehicle control in some forms of the present disclosure.

Referring to FIG. 4A and FIG. 4B, a communicating unit in some forms of the present disclosure may try a second authentication when the user enters the vehicle after unlocking the vehicle door through performing a first authentication with a user terminal.

For the second authentication, the communicating unit outputs an encrypted sound signal in the form of a high frequency sound signal through a vehicle speaker.

The sound wave level of the encrypted sound signal output through the vehicle speaker is lowered as the distance from the vehicle increases. The encrypted sound signal has the largest sound wave level in the vehicle, and has a relatively low sound wave level outside the vehicle. Particularly, when the vehicle window is closed, the sound wave level of the encrypted sound signal at outside the vehicle is significantly reduced.

That is, the sound wave level of the encrypted sound signal received by the user terminal, it is possible to determine whether the user terminal is present inside or outside the vehicle.

Figure 5A:
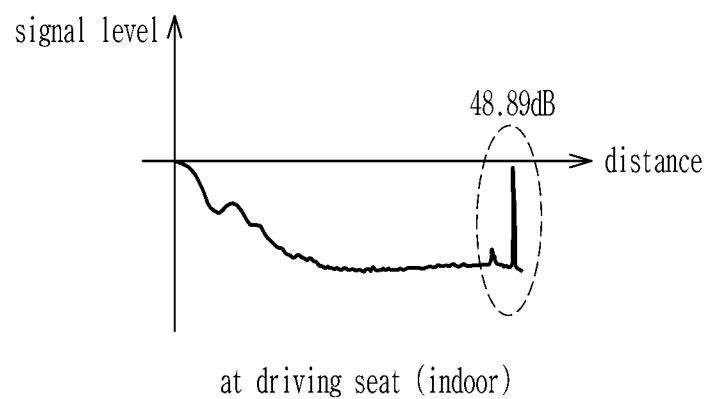
FIGS. 5A, 5B and 5C are groups of graphs schematically illustrating a system for a connected vehicle control in one form of the present disclosure.
Figure 5B:
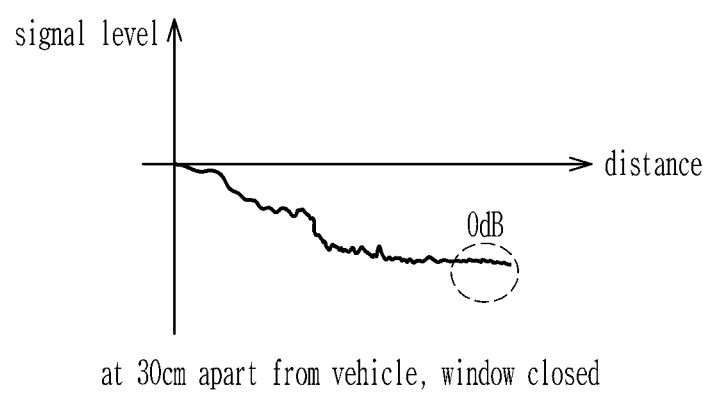
Figure 5C:
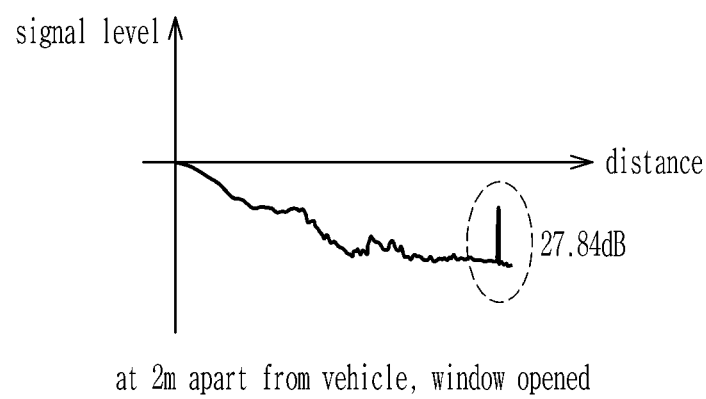

FIG. 5A is an experimental graph schematically showing sound wave level of encrypted sound signal received from the driver's seat in a vehicle, FIG. 5B is an experimental graph schematically showing sound wave level of encrypted sound signal received 30 cm outside the vehicle when the vehicle window is closed, and FIG. 5C is an experimental graph schematically showing sound wave level of encrypted sound signal received 2 m outside the vehicle when the vehicle window is opened.

Referring to FIG. 5A to FIG. 5C, a communicating unit in some forms of the present disclosure outputs an encrypted sound signal in the form of a high frequency sound signal through a vehicle speaker, and the user application receives it through a microphone that is typically provided in a user terminal.

When the vehicle window is closed, the sound wave level of the encrypted sound signal at outside the vehicle is significantly reduced. Accordingly, at 30 cm outside the vehicle, the encrypted acoustic signal is hardly detected.

When the vehicle window is open, the sound wave level of the encrypted sound signal at the vehicle outside the vehicle is gradually lowered according to the distance from the vehicle.

Accordingly, sound wave level of encrypted sound signal received 2 m outside the vehicle when the vehicle window is opened is less than sound wave level of encrypted sound signal received from the driver's seat in a vehicle, and much greater than sound wave level of encrypted sound signal received from outside the vehicle when the vehicle window is closed.

As such, the sound wave level of the encrypted sound signal output through the vehicle speaker is lowered as the distance from the vehicle increases. The encrypted sound signal has the largest sound wave level in the vehicle, and has a relatively low sound wave level outside the vehicle.

Particularly, when the vehicle window is closed, the sound wave level of the encrypted sound signal at outside the vehicle is significantly reduced. On the other hand, when the vehicle window is open, such remarkable difference does not occur, and the sound wave level gradually decreases as the distance from the vehicle increases.

That is, the sound wave level of the encrypted sound signal received by the user terminal, it is possible to determine whether the user terminal is present inside or outside the vehicle.

Figure 6:
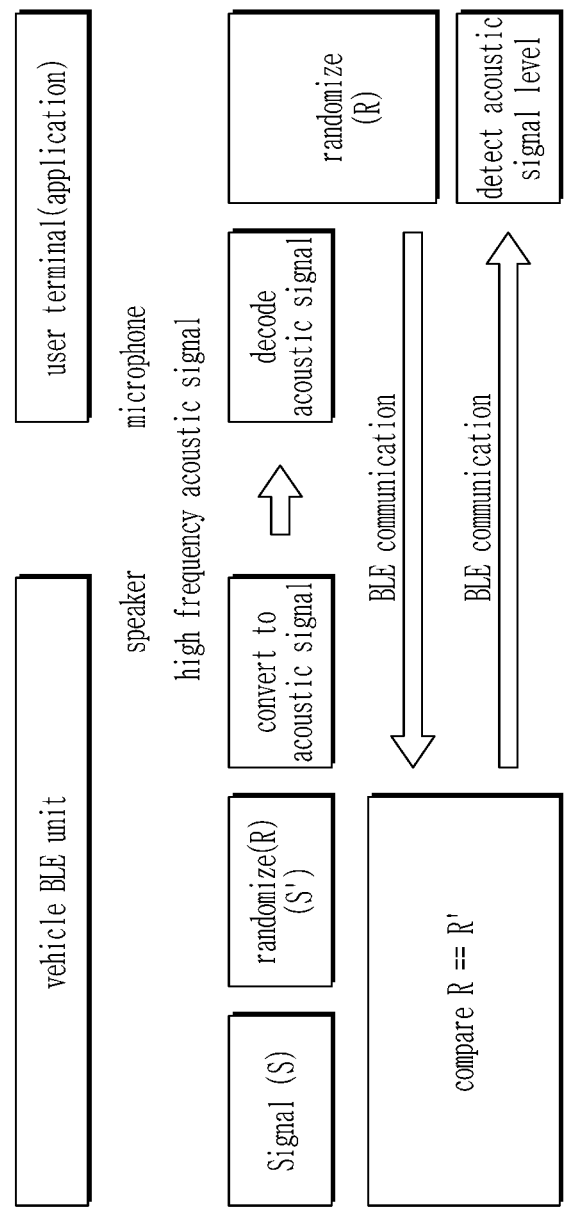
FIG. 6 is a block diagram schematically illustrating a step of second authentication in one form of the present disclosure.

FIG. 6 is a block diagram schematically illustrating a step of second authentication in some forms of the present disclosure.

Referring to FIG. 6, the communicating unit converts a signal to be transmitted to a user application into a form of a high frequency sound signal and outputs the same through a vehicle speaker. Further, the user application receives it through a microphone that is typically provided in a user terminal. Here, the signal transmitted to the user application may be a simple message or may be an identifier for determining a specific condition. Hereinafter, a process of transmitting and receiving an identifier for the second authentication step will be described. For encryption and decryption which will be described later, scheme such as AES (Advanced Encryption Standard)-128 scheme may be used.

When the communicating unit 110 and the user application 12 are connected through wireless communication, the communicating unit 110 converts the identifier S for the second authentication to generate an encrypted signal S'. This may be schematically expressed as following Equation 1.

$$S'=R(S) \qquad \text{[Equation 1]}$$

The communicating unit 110 converts the encryption signal S' into a high frequency sound signal and outputs the converted signal through the vehicle speaker 115 of the vehicle. In the above-described conversion and transmission, Fast Fourier Transform (FFT) and Orthogonal Frequency Division Multiplexing (OFDM) may be used.

When the high frequency sound signal is received through the microphone, the user application 12 converts it into the form of an encryption signal S'. The user application 12 generates a response signal R by randomly encrypting it using the second authentication key K. This may be schematically expressed as following Equation 2.

$$R=AES128(S',K) \qquad \text{[Equation 2]}$$

As described above, the second authentication key K is shared when the vehicle information is registered in the user application 12 and stored in the user application 12 and the communicating unit 110.

The user application 12 transmits the response signal R to the communicating unit 110 through wireless communication.

The communicating unit 110 generates the verification signal R' by randomly encrypting the encryption signal S' by using the second authentication key K. This may be schematically expressed as following Equation 3.

$$R'=AES128(S',K) \qquad \text{[Equation 3]}$$

The communicating unit 110 compares the response signal (R) and the verification signal (R') to determine the validity. This may be schematically expressed as following Equation 4.

$$R'==R \qquad \text{[Equation 4]}$$

When the validity of the response signal R and the verification signal R' is confirmed, the communicating unit 110 notifies the user application 12 of this.

Further, the user application 12 compares a sound wave level of the high frequency sound signal received through the microphone with a preset reference value. When the sound wave level is greater than or equal to the reference value, it is confirmed that the user terminal 10 is inside the vehicle.

As such, a communicating unit in some forms of the present disclosure may improve security of a vehicle starting control by performing second authentication like a conventional art, and also, may reduce the cost for design and production by deleting the LF antenna of the conventional art and performing the second authentication through a vehicle speaker that is typically provided in the vehicle instead.

Figure 7:
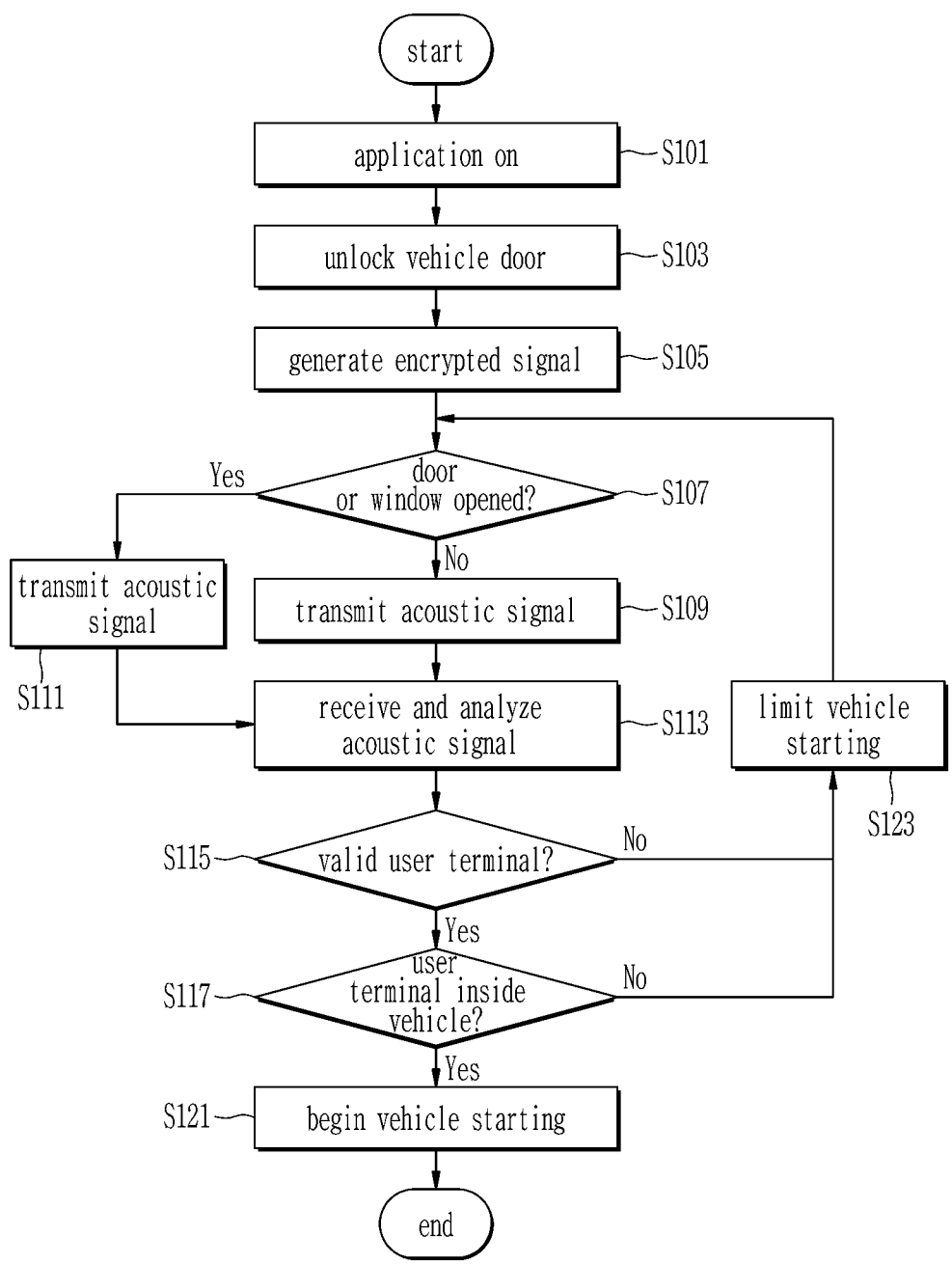
FIG. 7 is a flowchart schematically illustrating a method for a connected vehicle control in one form of the present disclosure.

FIG. 7 is a flowchart schematically illustrating a method for a connected vehicle control in some forms of the present disclosure.

Referring to FIG. 7, the user operates a user application 12 installed in a user terminal 10 for the connected vehicle control in step S101

When the user application 12 is connected to the communicating unit 110 of the vehicle through wireless communication through the RF antenna 111 of the vehicle, and a remote control function of the user application 12 is activated. Here, the remote control function of the user application 12 includes at least door lock/unlock function so that the user can remotely lock or unlock the vehicle door.

When the user unlocks the vehicle door through the remote control function in step S103 and enters the inside of the vehicle and presses the start button 140, a starting on signal is input to the controller 150 of the vehicle.

When a starting on signal is input from a start button 140, the controller performs a second authentication between the communicating unit 110 and the user application 12 to determine whether the user got into the vehicle.

The communicating unit 110 generates an encrypted sound signal for the second authentication in step S105. For this purpose, the communicating unit 110 encrypts a pre-stored second authentication code, and converts it into the form of a high frequency sound signal.

That is, the encrypted acoustic signal is generated in the form of a high frequency sound signal and has a frequency of at least 18 kHz. Such high frequency sound signal can be received through a microphone provided in a typical user terminal, but is inaudible to human ears. Thus, even if the encrypted sound signal is output for the second authentication, the user is not disturbed thereby.

Thereafter, the controller 110 determines whether the vehicle door or vehicle window is opened through the body control module 130 at step S107. This is to determine the strength of the encrypted sound signal output through the vehicle speaker. When the vehicle door and the vehicle window are closed, the communicating unit 110 outputs the encrypted sound signal with a second predetermined sound level at step S109. On the other hand, when the vehicle door or the vehicle window is open, the communicating unit 110 outputs the encrypted sound signal with a third predetermined sound level at step S111. Here, the third predetermined sound level is set to a value less than the second predetermined sound level.

As described with reference to FIG. 5, when the vehicle window and vehicle door are closed, the sound wave level of the encrypted sound signal at outside the vehicle is significantly reduced. On the other hand, when the vehicle window or the vehicle door are open, such remarkable difference does not occur, and the sound wave level gradually decreases as the distance from the vehicle increases.

Therefore, when the vehicle door or the vehicle window is open, the communicating unit 110 outputs the encrypted sound signal at a relatively low sound wave level.

When the user application 12 receives the encrypted sound signal through the microphone of the user terminal 10 at step S113, the user application 12 and the communication unit 110 analyze the encrypted sound signal through wireless communication. Such the analysis performed as described in FIG. 6.

If the encrypted sound signal is analyzed to be valid, then the user terminal 10 is determined to be a valid user terminal in which the vehicle information is registered in step S115.

On the other hand, if the encrypted sound signal is not analyzed to be valid, then the user terminal 10 is determined not to be a valid user terminal in which the vehicle information is registered. Thereby, vehicle starting is limited in step S123.

If the user terminal is determined to be valid in step S115, the user application 12 determines whether the sound wave level of the encrypted sound signal received through the microphone is equal to or greater than a first predetermined sound level at step S117.

The sound wave level of the received encrypted sound signal varies depending on the distance between the vehicle speaker and the user terminal 10, and becomes smaller as the user terminal 10 is farther from the vehicle speaker. That is, if the sound wave level of the received encrypted sound signal is more than a certain level, the user terminal 10 is closer to the vehicle speaker than a certain distance.

When the sound wave level of the received encrypted sound signal is equal to or greater than the first predetermined sound level, the user terminal 10 is determined to be inside the vehicle at step S117.

On the other hand, when the sound wave level of the received encrypted sound signal is less than the first predetermined sound level, the user terminal is determined to be outside the vehicle at step S123. Thereby, vehicle starting is limited in step S123.

If the user terminal 10 is determined to be a valid in step S115 and the user terminal 10 is determined to be inside the vehicle in step S117, the second authentication succeeds and the vehicle starting is initiated.

When the second authentication is failed, the communicating unit 110 and the user application 12 may retry the second authentication.

As such, in some forms of the present disclosure, since the vehicle may be started only when the user terminal exists inside the vehicle, it is possible to prevent the intruder from starting the vehicle and seizing the vehicle even through the door is unlocked outside the vehicle and the intruder arbitrarily opens the door and enters the vehicle.

By limiting the BLE communication range conforming to the second authentication condition for starting the vehicle to the interior of the vehicle, an environment in which the signal may be seized and processed from the outside may not be provided and may be basically blocked, thereby providing a stable smartkey-free vehicle control service. This may provide a stable smartkey-free vehicle control service by blocking a physical hacking access separately from additional and complex security solutions such as logins, user function limitations, encryption logic application, and the like.

For example, in some forms of the present disclosure described above, the communicating unit 110 is assumed to be a BLE module, but is not limited and may be implemented through a local communication module.

For example, the communicating unit 110 may also be implemented by at least one of Wifi, wireless LAN, radio frequency (RF), and ZigBee which is capable of performing local communication with the user terminal 10 by the RF and LF antennas which are simultaneously implemented.

Therefore, there is an advantage that a smartkey-free start service may be variously performed according to communication type compatible with the type of user terminal 10.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

10: user terminal
12: user application
100: vehicle control system
110: communicating unit
111: RF antenna
113: communication control module
115: vehicle speaker
120: head unit
130: body control module
140: start button
150: controller

What is claimed is:
1. A system for connected vehicle control, comprising:
a communicator configured to:
    connect, through a wireless communication, with a user application of a user terminal within a predetermined sensing distance; and
    perform a first authentication and a second authentication, wherein the user application is configured to register vehicle information and to provide a remote control function to remotely control a vehicle with the registered vehicle information;
a vehicle speaker;
a body controller configured to control the vehicle based on a remote control signal transmitted by the user application;
a start button formed inside the vehicle and configured to generate a start-on signal by pushing the start button; and
a controller configured to control a start of the vehicle;
wherein the vehicle information comprises at least one of a Vehicle Identification Number(VIN), a first authentication key or a second authentication key,
wherein the remote control signal is received from the user terminal when the remote control function is activated by the first authentication,
wherein the communicator is configured to:
generate an encrypted sound signal to perform the second authentication;
output the encrypted sound signal through the vehicle speaker; and
receive a response signal from the user terminal in response to the encrypted sound signal,
wherein, when the start-on signal is input, the controller is configured to start the vehicle only when the second authentication is successful,
wherein the communication controller is configured to:
set an output level of the encrypted sound signal output by the vehicle speaker to be a second predetermined sound level when vehicle doors and vehicle windows are all closed; and
set the output level of the encrypted sound signal output by the vehicle speaker to be a third predetermined sound level when the vehicle doors and the vehicle windows are not all closed, and
wherein the third predetermined sound level is set to a value less than the second predetermined sound level.

2. The system of claim 1, wherein the communicator is implemented by Bluetooth low energy (BLE).

3. The system of claim 2, wherein the communicator comprises:
an RF antenna configured to:
radiate an RF signal to an outside of the vehicle; and
performing a remote wireless communication connection with the user terminal; and
a communication controller configured to:
store authentication information including a first authentication code, a second authentication code, the first authentication key, and the second authentication key for performing the first authentication and the second authentication when the user application is connected.

4. The system of claim 3, wherein the communication controller is configured to:
when the user terminal within the predetermined sensing distance is detected, connect with the user application through the wireless communication and perform the first authentication by transferring the first authentication code to the user application.

5. The system of claim 4, wherein the communication controller is configured to:
when the first authentication is successful, generate an encrypted signal by encrypting the second authentication code, and generate an encrypted sound signal by converting the encrypted signal into a sound signal; and receive, through the wireless communication, a response signal generated by the user application by converting the encrypted sound signal with the second authentication key after receiving the encrypted sound signal through a microphone of the user terminal.

6. The system of claim 5, wherein the communication controller is configured to:
generate a verification signal by converting the encrypted sound signal with the second authentication key; and
determine whether the response signal is valid by comparing the response signal received from the user application with the verification signal,
wherein the second authentication is successful when the response signal is determined to be valid and when a sound wave level of the encrypted sound signal received through the microphone is equal to or greater than a first predetermined sound level.

7. The system of claim 1, wherein:
the encrypted sound signal is generated in a form of a high frequency sound signal and has a frequency of at least 18 kHz.

8. The system of claim 1, wherein the controller is configured to:
transmit the start-on signal to at least one of an engine, a driving motor, or a fuel cell stack based on a vehicle type; and
start the vehicle.

9. The system of claim 1, wherein the communicator is implemented by at least one of Wifi, wireless LAN, radio frequency (RF), or Zigbee that performs local communication connection with the user terminal.

10. A method for controlling a connected vehicle control, the method comprising: connecting, by a communicator of a vehicle, through a wireless communication with a user application of a user terminal within a predetermined sensing distance;
performing, by the communicator, a first authentication of the user application such that a remote control function in the user application is activated when the first authentication is successful;
performing, by the communicator, a second authentication of the user application when a start-on signal is input;
initiating, by a controller, a start of the vehicle when the second authentication is successful; and
limiting, by the controller, the start of the vehicle when the second authentication is not successful,
wherein performing the second authentication further comprises:
generating, by the communicator, an encrypted sound signal;
outputting the encrypted sound signal through a vehicle speaker; and
receiving a response signal from the user terminal in response to the encrypted sound signal,
wherein generating the encrypted sound signal further comprises:
determining whether vehicle doors and vehicle windows are all closed;
setting the output level of the encrypted sound signal output by the vehicle speaker to be a second predetermined sound level when the vehicle doors and the vehicle windows are all closed; and
setting the output level of the encrypted sound signal output by the vehicle speaker to be a third predetermined sound level when the vehicle doors and the vehicle windows are not all closed, wherein the third predetermined sound level is set to a value less than the second predetermined sound level.

11. The method of claim 10, wherein performing the first authentication comprises:
 connecting, by the communicator, with the user application of the user terminal within a predetermined sensing distance;
 transmitting, by the communicator, a first authentication code to the user application; and
 determining, by the user application, whether a first authentication key is valid based on the first authentication code.

12. The method of claim 10, wherein generating the encrypted sound signal comprises:
 generating an encrypted signal by encrypting a second authentication code; and
 generating the encrypted sound signal by converting the encrypted signal into a sound signal.

13. The method of claim 10, wherein performing the second authentication further comprises:
 receiving, by the user application, the encrypted sound signal through a microphone of the user terminal;
 generating, by the user application, a response signal by converting the encrypted sound signal with a second authentication key;
 transferring the response signal to the communicator through a wireless communication;
 generating, by the communicator, a verification signal by converting the encrypted sound signal with the second authentication key; and
 determining whether the second authentication is successful.

14. The method of claim 13, wherein determining whether the second authentication is successful comprises:
 determining, by the communicator, whether the response signal is valid by comparing the response signal received from the user application with the verification signal; and
 determining, by the user application, whether a sound wave level of the encrypted sound signal received through the microphone is equal to or greater than a first predetermined sound level,
 wherein the second authentication is successful when the response signal is determined to be valid and when the sound wave level of the encrypted sound signal is equal to or greater than the first predetermined sound level.

15. The method of claim 10, wherein the encrypted sound signal is generated in a form of a high frequency sound signal and has a frequency of at least 18 kHz.

* * * * *